Patented Aug. 3, 1954

2,685,521

UNITED STATES PATENT OFFICE 2,685,521

FOOD CONTAINERS AND COATING THEREFOR

Albert C. Edgar, River Forest, Ill., assignor to Wilson & Co., Inc., a corporation of Delaware No Drawing. Application May 4, 1950,
Serial No. 160,109

5 Claims. (Cl. 99—187)

This invention relates to methods for preventing the adhesion of meat to the inner surfaces of containers therefor. It also relates to compositions for preventing the adhesion of meat to the inner surfaces of containers and to containers coated with such materials.

In the manufacture of canned meats such as luncheon meats, corned beef hash, spiced ham, potted meats, salmon and like proteinaceous meaty materials, the containers, usually metal cans, are filled with the meat, covered, and sealed. These cans are generally made of metal, suitably of sheet iron, and may be used in untreated form. Preferably they are used with the interior surfaces thereof coated with tin and/or lacquer or other materials, in accordance with standard procedures. After the cans are filled with the meat product they are sealed and the sealed cans are then placed in a steam retort or similar cooker, and cooked, frequently under pressure, for about one to two hours, the amount of pressure and the time of cooking depending on the kind of meat and the size of can used.

A serious problem in the manufacture of canned meats has been the tendency of these products to adhere to the interior surfaces of the cans as a result of the cooking operation. This adhesion of meat to the can not only causes difficulty in effecting a complete removal of the contents of the can, but also results in wastage and inconvenience to the consumer who has to scrape off the adhering meat from the sides and bottom of the container. Furthermore, the appearance of the contents is frequently impaired, particularly with products such as luncheon meats which are removed from the can as a formed cohesive unit, because portions of the adhering surface meat are torn away during removal of the meat from the can.

This tendency of the meat to adhere to the interior surfaces of the can occurs not only when the interior surfaces of the can are untreated sheet iron or other suitable metal, but also when these interior metallic surfaces have been treated or coated with lacquer, tin and the like in accordance with conventional procedures.

One expedient which has been used in the industry in the past in combating this problem is to encase the meat in paper, such as parchment paper and the like, before placing the paper-coated meat in the can. This treatment prevents the adhesion of the meat to the walls and bottom of the can, but is objectionable because there is considerable adhesion of meat to the paper.

Another expedient used in the industry in the past has been the application of a film of melted lard to the inner surfaces of the can. It has been found that a film of lard on the inner surfaces of the can has some beneficial effect in reducing the adhesion of meat to the walls and bottom of the can. While this use of lard is regarded favorably because it is a natural edible product and because of its relatively low cost, the results obtained with lard were not uniform and actually were far from being acceptable for commercial operations. Hence its use as a coating for cans to prevent the adhesion of meat to the interior walls of the can has not been widespread.

In accordance with the present invention I have found that I can eliminate adhesion between the interior surfaces of a can and the surfaces of meat contained therein by the aid of lard, by incorporating with the lard prior to its application as a coating to the interior surfaces of the can a relatively small amount of a glyceryl partial ester of a higher saturated or unsaturated fatty acid or a mixture of such acids.

The amount of glyceryl partial ester which may be used in homogeneous admixture with lard in accordance with the present invention may be varied rather widely, from about 5% by weight upwardly, based upon the weight of the composition. In general, there is an improvement in the characteristics of the composition for use in accordance with the present invention as the quantity of glyceryl partial ester used in the composition is increased above about 5% and up to about 25% by weight, although the improvement is not necessarily progressive or uniform since it varies with the individual glyceryl partial ester or mixture of glyceryl partial esters used. The present invention also contemplates the use of glyceryl partial ester in combination with lard in amounts larger than 25% by weight, say up to about 50% by weight and even more, but it is to be noted that such larger amounts are not necessary and may even be wasteful of this relatively more costly material. For most purposes a composition in accordance with the present invention containing about 10% by weight of glyceryl partial ester is satisfactory. In general, I prefer to use not less than about 8% by weight of glyceryl partial ester in the composition.

The acid which may be used in forming the glyceryl partial esters may either be a saturated acid, an unsaturated acid, or a mixture of such acids, having from 12 to 22 carbon atoms in the molecule. Examples of such acids are lauric acid, myristic acid, oleic acid, palmitoleic acid, palmitic acid, stearic acid, hydroxy-stearic acid, arachidic acid, mixed higher fatty acids derived from animal or vegetable origin, such as, for example, from soya bean oil, cottonseed oil, coconut oil, peanut oil, sesame oil, sardine and other fish oils, lard and tallow, and partial or completely hydrogenated mixed higher fatty acids derived from animal or vegetable origin such as those mentioned.

The preferred glyceryl partial esters are the monoglycerides of fatty acids having from 12 to 22 carbon atoms in the molecule, especially the saturated fatty acids such as palmitic acid and stearic acid, particularly the latter. The monoglycerides are preferred, in general, because of their greater efficacy in cooperating with the lard in preventing the adhesion of meat to the interior walls of the can. The monoglycerides of saturated fatty acids such as stearic acid are preferred because of their stability against rancidity.

From the standpoint of compatibility and expediency it is preferred to use as the glyceryl partial ester constituent of the adhesion-preventing composition of the present invention a mixture of mono- and diglycerides derived from lard, preferably from partly or completely hydrogenated lard. It is preferred to use hydrogenated lard and that this hydrogenated lard have an iodine value ranging from about 0 to 20, preferably from about 3 to 12.

The composition of the present invention is made by melting together the lard and glyceryl partial ester and stirring the same into homogeneous admixture. The mixture on cooling to normal room temperature is solid. The composition is melted and is applied in melted form to the interior surfaces of the can, as by swabbing or by spraying. The molten composition lends itself to spraying in conventional, inexpensive spraying equipment at temperatures of the composition of about 150° F. At this relatively low temperature the spray hits the interior surfaces of the can while the sprayed particles are still in liquid form. While the glyceryl partial esters are themselves suitable for use to prevent the adhesion of canned meats to the interior surfaces of the cans, they require special heating and spray equipment and when these sprayed particles hit the surface of the cans the particles are in solid form. In consequence the can must be preliminarily heated so that the solid sprayed particles are melted and fused into a continuous film, or the can must be heated subsequent to the spray operation to bring about the required fusion of the sprayed particles. It is thus manifest that substantial advantages accrue in the use of the lard and glyceryl partial ester composition of the present invention over the glyceryl partial ester per se.

When the composition of the present invention is applied as a film uniformly over the interior surfaces of the can the treated meat contents fall out readily from the can when the same is inverted and there are no patches of meat particles adhering to the surfaces of the can.

The invention and the advantages thereof will be readily understood from the following specific examples of illustrative embodiments of the invention contrasted with an example involving the use of lard per se as the coating material.

Twenty-four twelve-ounce oblong sheet iron cans with tin-coated interior surfaces of the type commonly used in the canning of luncheon meats were divided into four equal groups and marked B, C, D and E.

The cans in lots B, C and D were treated by spraying their interior surfaces with melted material of the following composition.

In the compositions to be set forth below reference will be made to "monoglycerides" and it will be understood that this term refers to the glyceryl partial esters (mono- and di-) derived from the reaction of glycerine with lard (lard flakes), hydrogenated to an iodine value of about 6 in accordance with conventional procedures. Such glyceryl partial ester mixtures, as is known, consist generally of approximately 60% of the monoglyceride and 40% of the diglyceride.

B. 0.25 gram of a mixture of 75% monoglycerides and 25% lard.
C. 0.40 gram of a mixture of 50 parts monoglycerides and 50 parts lard.
D. 0.6 gram of a mixture of 10 parts monoglycerides and 90 parts lard.

The cans in lot E were treated by spraying the interior surfaces of the cans with melted lard. 0.70 gram of lard was sprayed on the interior surface of each can in this lot.

All of the lots of cans were then run through a filling machine and filled with beef luncheon meat, sealed, and placed in a steam retort under ten pounds steam pressure for ninety minutes. The cooking temperature of the meat was approximately 230° F. The cans were then removed from the retort, held in a room at 70° F. for three days and then opened. The contents of the cans in lots B, C and D were readily removed from the cans by simply removing the end of each can and inverting the cans, whereupon the meat slipped out easily. An examination of the inner surfaces of the cans of lots B, C and D revealed no particles of meat adhering thereto. In contrast, the contents of the cans of lot E were removed with some difficulty, requiring running a knife around each can to loosen the meat from the interior surfaces of the can. After removal of the meat the interior surfaces of the cans were inspected and it was found that patches of meat particles clung to each of the cans.

The results with lard were even less effective than as described above when the interior surfaces of each can were coated with 0.6 gram of lard distributed uniformly over the surfaces.

While I prefer to use from about 0.25 to about 0.6 gram of coating material to about forty-five to fifty square inches of surface, lesser amounts than this have proven to be beneficial in preventing adhesion of meat to the interior surfaces of a can. Large amounts are generally wasteful of the material.

My invention is not to be construed as limited to the methods of application described in the illustrative examples since other methods may be used, as will be evident to skilled workers in the art. Nor is it intended that it be limited in its application to animal protein matter, since it readily applicable to marine protein materials, such as fish and fish products as well. Nor is my invention to be construed as limited to the coating of cans or similar containers since paper or similar wrapping materials can be covered with the coating materials of the present invention and the treated paper wrapped around meats prior to being placed in the cans. Furthermore, my invention is applicable to plastic and glass containers as well as those made of metal.

I claim:

1. The process of preventing the adhesion during cooking of proteinaceous meaty materials to the interior surfaces of a container which comprises applying to such surfaces, prior to cooking the said meaty materials in said container, a solid continuous coating of a composition consisting essentially of lard and at least about 5% by weight of a glyceryl partial ester of a fatty acid containing from 12 to 22 carbon atoms in the molecule, and cooking the said meaty materials in said container while the same are in contact with said coating.

2. The process of preventing the adhesion during cooking of proteinaceous meaty materials to the interior surfaces of a container which comprises applying to such surfaces, prior to cooking the said meaty materials in said container, a solid continuous coating of a composition consisting essentially of lard and at least about 5% by weight of glyceryl monostearate, and cooking the said meaty materials in said container while the same are in contact with said coating.

3. The process of preventing the adhesion during cooking of proteinaceous meaty materials to the interior surfaces of a container which comprises applying to such surfaces, prior to cooking the said meaty materials in said container, a solid continuous coating of a composition consisting essentially of lard and at least about 5% by weight of a glyceryl partial ester of a saturated fatty acid containing from 12 to 22 carbon atoms in the molecule, and cooking the said meaty materials in said container while the same are in contact with said coating.

4. The process of preventing the adhesion during cooking of proteinaceous meaty materials to the interior surfaces of a container which comprises applying to such surfaces, prior to cooking the said meaty materials in said container, a solid continuous coating of a composition consisting essentially of lard and at least about 5% by weight of a mixture of mono- and di-glycerides derived from lard, and cooking the said meaty materials in said container while the same are in contact with said coating.

5. The process of preventing the adhesion during cooking of proteinaceous meaty materials to the interior surfaces of a container which comprises applying to such surfaces, prior to cooking the said meaty materials in said container, a solid continuous coating of a composition consisting essentially of lard and at least about 5% by weight of a mixture of mono- and di-glycerides derived from hydrogenated lard, and cooking the said meaty materials in said container while the same are in contact with said coating.

References Cited in the file of this patent

UNITED STATES PATENTS

| Number | Name | Date |
|---|---|---|
| 1,547,571 | Ellis | July 28, 1925 |
| 1,826,900 | Schrader | Oct. 13, 1931 |
| 1,873,513 | Van Loon | Aug. 23, 1932 |
| 2,316,804 | Musher | Apr. 20, 1943 |